United States Patent
Cummins

(10) Patent No.: US 10,170,124 B2
(45) Date of Patent: Jan. 1, 2019

(54) VOICE-CONTROLLED COMPUTER SYSTEM

(71) Applicant: MasterCard International Incorporated, Purchase, NY (US)

(72) Inventor: Oran Cummins, Dublin (IE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 180 days.

(21) Appl. No.: 14/304,021

(22) Filed: Jun. 13, 2014

(65) Prior Publication Data

US 2014/0372127 A1    Dec. 18, 2014

(30) Foreign Application Priority Data

Jun. 14, 2013 (GB) .................................. 1310659.6

(51) Int. Cl.
| | |
|---|---|
| *G10L 25/00* | (2013.01) |
| *G10L 17/24* | (2013.01) |
| *G06F 21/31* | (2013.01) |
| *G02B 27/01* | (2006.01) |
| *G10L 15/22* | (2006.01) |

(52) U.S. Cl.
CPC ............ *G10L 17/24* (2013.01); *G02B 27/017* (2013.01); *G06F 21/31* (2013.01); *G02B 2027/014* (2013.01); *G10L 15/22* (2013.01)

(58) Field of Classification Search
CPC ....................................................... G10L 15/22
USPC .......................................... 704/273, E15.001
See application file for complete search history.

(56) References Cited

U.S. PATENT DOCUMENTS

| | | | | |
|---|---|---|---|---|
| 8,898,064 B1* | 11/2014 | Thomas | .................. | G06F 21/32 704/270 |
| 2005/0278545 A1* | 12/2005 | Adams | .................. | H04L 63/083 713/183 |
| 2006/0103590 A1* | 5/2006 | Divon | .................... | G02B 27/01 345/7 |
| 2012/0050008 A1* | 3/2012 | Rosener | ............. | G07C 9/00142 340/5.21 |
| 2012/0275761 A1* | 11/2012 | Li | ........................ | H04N 9/8233 386/239 |
| 2013/0297316 A1* | 11/2013 | Cragun | ................... | G06F 3/167 704/270 |

* cited by examiner

*Primary Examiner* — Forrest F Tzeng
(74) *Attorney, Agent, or Firm* — Buchanan Ingersoll & Rooney PC

(57) ABSTRACT

A voice-controlled computer system comprising a headset with a heads up display (HUD). When the system requires a user to verbally enter a character of an alphanumeric security code the system presents to the user on the HUD a plurality of different pairs of alphanumeric characters each containing a first character and an associated (pseudo) randomly generated second character. The first character of one pair is the code character to be entered, but for security reasons the user is required to verbally enter the second character associated with the code character, not the code character itself. The system deciphers verbal entry of the associated second character as equivalent to entry of the first character.

12 Claims, 2 Drawing Sheets

(a)

(b)

(c)

VOICE-CONTROLLED COMPUTER SYSTEM

This invention relates to a voice-controlled computer system comprising a headset with a heads up display (HUD).

An example of such a computer system is that known by the trademark Google Glass which is being developed by Google with the object of producing a mass-market computer. Google Glass displays information in a smartphone-like hands-free format that can interact with the Internet via natural language voice commands. The Google Glass headset is in the general form of a spectacles frame having a small display optic in front of one or each eye. While the Google Glass headset does not currently have conventional spectacle lenses fitted to it, future versions are expected to be available with sunglass or prescription lenses.

Since these wearable computer systems are predominantly controlled by voice recognition, alphanumeric security codes such as passwords and PIN numbers requested by the system are normally entered verbally. However, this gives rise to obvious security issues due to the potential of the security code being overheard by eavesdroppers.

According to the present invention there is provided a voice-controlled computer system comprising a headset with a heads up display (HUD), wherein when the system requires a user to verbally enter a character of an alphanumeric security code the system presents to the user on the HUD a plurality of different pairs of alphanumeric characters each containing a first character and an associated (pseudo) randomly generated second character, wherein the first character of one pair is the code character to be entered, and wherein the system deciphers verbal entry of the associated second character as equivalent to entry of the first character.

An embodiment of the invention will now be described, by way of example, with reference to the accompanying drawings, in which.

Figure 1:
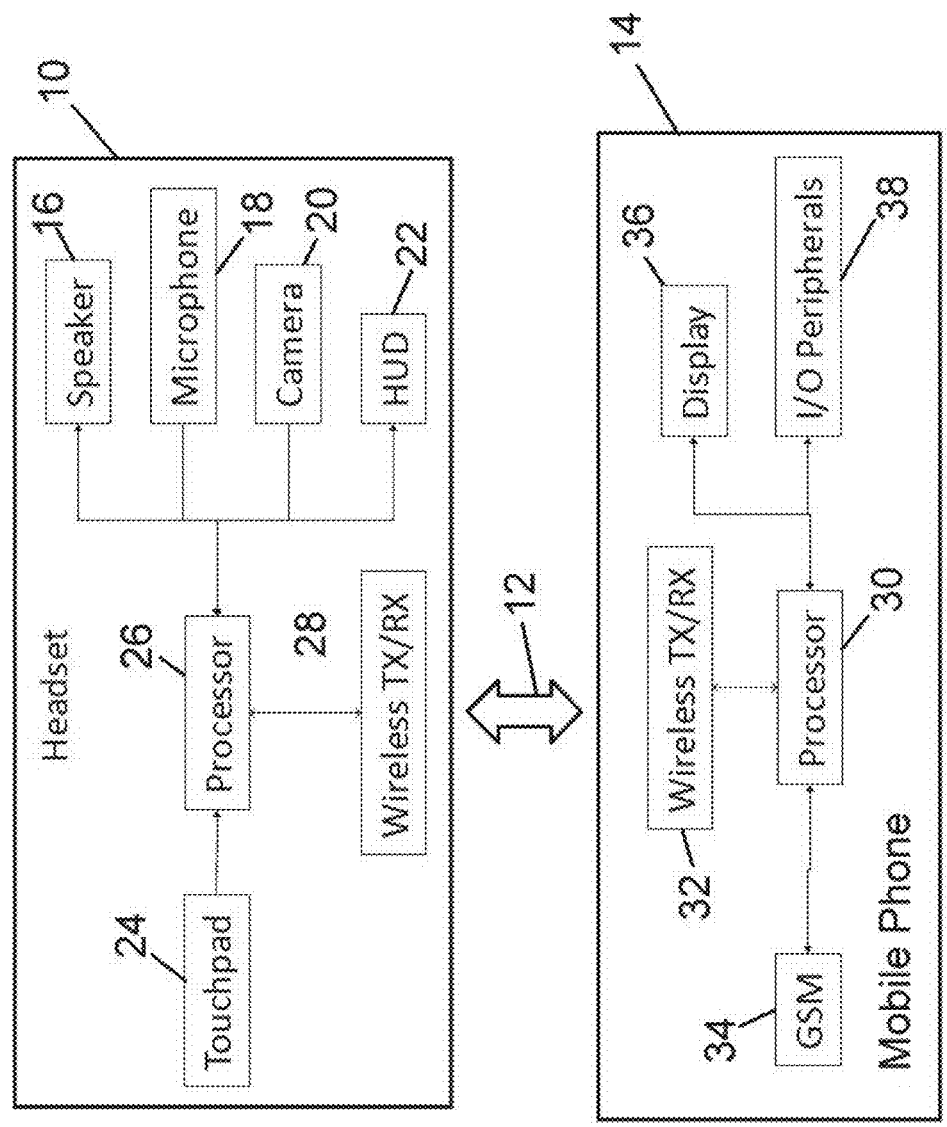
FIG. 1 is a schematic diagram of a known computing system which can be modified to operate according to an embodiment of the invention.

The computer system shown in FIG. 1 comprises the combination of a headset 10 in two-way wireless communication 12 with a mobile phone (cellphone) 14. The headset 10 may be that referred to above as Google Glass, and the mobile phone can be an advanced smartphone built on a mobile operating system with advanced computing capability and connectivity, such as an Apple iPhone 5 or an Android based device. Nonetheless, it will be appreciated that the invention is not limited to a mobile phone and could equally be implemented in conjunction with, for example, a tablet device; or possibly implemented completely within a headset platform.

The headset 10 comprises a speaker 16 (meaning any device capable of conveying sound to the headset wearer, including bone conduction), a microphone 18 to allow the wearer to enter spoken commands and data, a forward-facing digital camera 20, a touchpad 22 in the form of a touch-sensitive surface running along one sidearm of the spectacles-like frame, and a heads up display 24 in the form of a small display optic in front of one eye. These components are controlled by a data processor 26 which also handles all communication with the mobile phone 14 via a wireless transceiver 28 which may be a wireless LAN adaptor or a Bluetooth adaptor. The construction and operation of the Google Glass headset is publicly available and will not be further discussed here.

The mobile phone 14 comprises a data processor 30 in communication with the headset 10 by a wireless transceiver 32. The processor 30 handles external communications via a GSM module 34, and also controls a built-in display 36 and external peripherals via an I/O module 38. Such phones, and their construction and operation, are well known.

Although the headset 10 is capable of limited functionality when used on its own, it is most useful when wirelessly connected as an input/output periphery to a mobile phone 14. In such a case the phone 14 can supply data to the headset 10, for example, images for display on the HUD 22, and request data from the headset.

One type of data commonly requested by a mobile phone, for example when accessing financial websites, is an alphanumeric security code such as a pin number or password. Naturally the headset wearer would be ill advised to speak this out loud, so the present invention has been developed to avoid this.

When an alphanumeric security code is requested by the mobile phone 14, it generates, for each character of the code, a set of different pairs of alphanumeric characters. These pairs of characters are transmitted to the headset 10 and displayed by the HUD 22. For example, FIG. 2a shows the multiple pairs of characters which may typically be displayed in respect of the first character of the security code. Each pair contains a first character (upper left in each pair) and an associated (pseudo) randomly generated second character (lower right). The first character of one of the pairs is the alphanumeric code corresponding to the first character of the security code, in this case the first character of the security code is "8"; the first characters of the other pairs do not include the first character of the security code.

To enter a selected first character from the multiple pairs presented, such selected first character being (if the user is correct) the first character of the security code, the user speaks into the microphone 18 the second character associated with that selected first character. For example, FIG. 2a, if the user wished to enter the character "8" as the first character of the security code the user would instead speak the letter "K". The selected pair (in this case 8/K) would be highlighted after the system had successfully recognized the second character spoken by the user, whether or not the associated first character was in fact the correct first character of the security code. This is to merely indicate to the user that the system has successfully recognised the verbal entry of the second character of the pair. It does not necessarily indicate that the selected pair is the correct pair for the first character of the security code. In FIG. 2a the selected pair is shown highlighted in red, and happens in this case to be the correct pair—clearly such highlighting would occur only after selection by the user.

After the system had successfully recognized the second character spoken by the user in respect of the first character of the security code, whether correct or not, as indicated by the highlighted pair, the display is changed to present a second set of different pairs of alphanumeric characters, FIG. 2b. Only one pair has a first character which is the second character of the security code, in this case "2"; as before, the associated second characters of the pairs are randomly generated.

To enter the putative second character of the security code from the multiple pairs newly presented, the user speaks into the microphone 18 the second character of the pair containing the first character corresponding to the second character of the security code. Thus, FIG. 2b, if the user wished to enter the character "2" as the second character of the security code the user would instead speak the letter "T". Again the selected pair (in this case 2/T) would be highlighted after the system had successfully recognized the character spoken by the user, whether or not the associated first character was in fact the correct second character of the security code.

Now the display is changed once again to present a third set of different pairs of alphanumeric characters, FIG. 2c. Only one pair has a first character which is the third character of the security code, in this case "6", and the associated second characters of the pairs are randomly generated. The user selects the putative third character of the security code as before, by speaking the second character associated therewith in the respective pair of characters.

This process continues for further characters of the security code, if any. In each case the mobile phone 14 receives and deciphers the character spoken by the user as the other character of the pair containing that spoken character. If the user successfully enters all the characters associated with the security code characters, the security code is taken as successfully entered. Thus, assuming the security code is 826 in scenario set forth in FIG. 2, the user would have to speak KTQ to successfully enter the password.

Once the security code is entered, it can then be used within the computer system, for example, to provide access to an account or to use an account.

Figure 2:
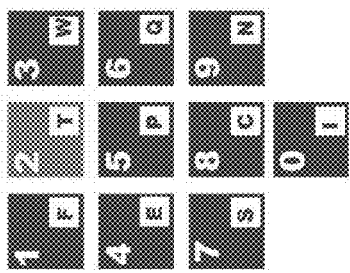
FIG. 2 illustrates the operation of the modified system.
Figure 2:
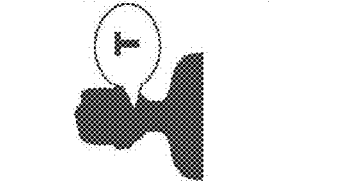
Figure 2:
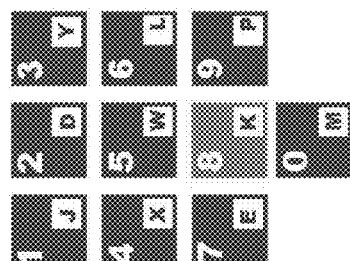
Figure 2:
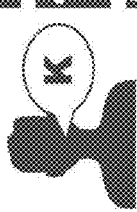
Figure 2:
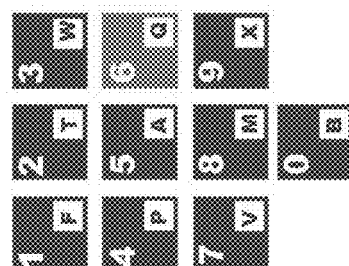
Figure 2:
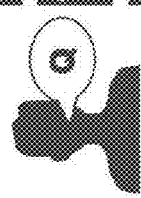

As seen in FIG. 2, the first character of each pair of characters remains the same for each successive character of the security code, while the second character of each pair is randomly changed for each successive character of the security code. Also, each set of pairs can be visually arranged in the layout of a standard numeric keyboard. This is convenient where the security code consists of numbers. However, a standard qwerty keyboard layout might be more appropriate where the security code consists of letters or mixed numbers and letters.

The invention can be implemented in any number of ways, for example, the software for implementing the above steps could be integrated within a stand-alone program running on the computer system; or the steps could be implemented within a driver or adaptor interposed between a standard smart-phone application and the headset. When such a driver detects the need to input secure data, it can replace the otherwise unsecured software for obtaining the security code from the user with software for performing the above described steps. In particular such a driver/adaptor could be implemented as a plug-in for a browser running on the computer system.

It will be understood that the present disclosure may be embodied in a computer readable non-transitory storage medium storing instructions of a computer program which when executed by a computer system results in performance of steps of the method described herein. Such storage media may include any of those mentioned in the description above.

The terms "comprises" or "comprising" are to be interpreted as specifying the presence of the stated features, integers, steps or components, but not precluding the presence of one or more other features, integers, steps or components or groups thereof.

The techniques described herein are exemplary, and should not be construed as implying any particular limitation on the present disclosure. It should be understood that various alternatives, combinations and modifications could be devised by those skilled in the art. For example, steps associated with the processes described herein can be performed in any order, unless otherwise specified or dictated by the steps themselves. The present disclosure is intended to embrace all such alternatives, modifications and variances that fall within the scope of the appended claims.

The invention is not limited to the embodiments described herein which may be modified or varied without departing from the scope of the invention.

The invention claimed is:

1. A voice-controlled computer system comprising:
a headset with a heads up display (HUD),
wherein when the system requires a user to verbally enter an alphanumeric security code, the system is configured to display on the HUD, to the user, a first plurality of different pairs of alphanumeric characters, from which the user may verbally select, each pair of the plurality of different pairs of alphanumeric characters including a first character and an associated, randomly generated second character,
wherein the first character of each pair of the plurality of different pairs of alphanumeric characters is a character of the alphanumeric security code to be entered,
wherein the system is configured to:
receive a verbal entry of the associated second character of a pair of the first plurality of different pairs of alphanumeric characters displayed on the HUD,
upon successful recognition of the verbal entry of the associated second character of the pair of the first plurality of different pairs of alphanumeric characters, change the display on the HUD such that a second plurality of different pairs of alphanumeric characters, from which the user may verbally select, is displayed thereon, said second plurality of different pairs differing from said first plurality of different pairs, and
decipher the verbal entry of the associated second character of the pair of the first plurality of different pairs as equivalent to entry of the first character of the pair of the first plurality of different pairs.

2. A computer system as claimed in claim 1, wherein each pair of the second plurality of different pairs includes a first character and an associated, randomly generated second character, and
wherein the first character of each pair of the first and second plurality of pairs is the same before and after the display is changed.

3. A computer system as claimed in claim 1, wherein the different pairs of the first plurality different pairs are visually arranged in the layout of a standard keyboard.

4. A computer system as claimed in claim 1, wherein the system comprises the headset and a mobile computing device, the headset including a data processor operatively connected to: (a) the HUD, (b) a microphone arranged to pick up the verbal entry of the second character, (c) a speaker, and (d) a wireless transceiver; and the mobile computing device being in two-way wireless communication with the processor via the transceiver.

5. A computer system as claimed in claim 4, wherein the mobile computing device is arranged to transmit data to the processor corresponding to the pairs of alphanumeric characters to be displayed on the HUD, and to receive and decipher data from the processor corresponding to the second character verbally entered by the user.

6. A computer system as claimed in claim 4, wherein the wireless transceiver comprises at least one of a wireless LAN adaptor and a Bluetooth adaptor.

7. A method of operating a voice-controlled computer system comprising a headset with a heads up display (HUD) requiring a user to verbally enter a character of an alphanumeric security code, the method comprising:

presenting, on the HUD, to the user, a first plurality of different pairs of alphanumeric characters from which the user may select, each pair of the first plurality of different pairs of alphanumeric characters including a first character and an associated, randomly generated second character, wherein the first character of a pair of the plurality of different pairs of alphanumeric characters is the character of the alphanumeric security code to be entered, receiving verbal entry of the associated second character of a pair of the plurality of different pairs of alphanumeric characters displayed on the HUD; and upon successful recognition of the verbal entry of the associated second character of the pair of the first plurality of different pairs of alphanumeric characters, changing, by the computer system, the display on the HUD such that a second plurality of different pairs of alphanumeric characters, from which the user may verbally select, is displayed thereon, wherein said second plurality of different pairs differs from said first plurality of different pairs; and deciphering, by the computer system, the verbal entry of the associated second character of the pair of the first plurality of different pairs as equivalent to entry of the first character of the pair of the first plurality of different pairs.

8. A method of authorizing user access to an account comprising using the deciphered verbal entry of claim 7 to constitute an element of an authorization code associated with said account.

9. A non-transitory computer readable storage medium, storing thereon a computer program product for a mobile computing device, said product being operative when the mobile computing device forms part of a system as claimed in claim 5 causing the mobile computing device to transmit to the headset said plurality of pairs of characters for each character of a security code to be verbally entered by a headset wearer, and to decipher verbal entry of a second character of a pair as equivalent to entry of the associated first character of the pair.

10. A computer system as claimed in claim 2, wherein the first character of each pair remains the same for each successive display change, while the second character of each pair is randomly changed for each successive character of the security code display change.

11. The computer system as claimed in claim 1, wherein the first character of each pair of the first and second plurality of pairs is the same before and after the display is changed.

12. The computer system as claimed in claim 1, wherein upon successful recognition of the verbal entry of the associated second character of the first pair of the first plurality of different pairs, the computer system highlights the verbally entered second character and first character associated therewith.

* * * * *